United States Patent Office 3,035,908
Patented May 22, 1962

3,035,908
STABLE GASOLINE MOTOR FUELS
Ralph I. Gottshall, Roslyn, Pa., John G. Peters, Audubon, N.J., and Howard W. Swain, Drexel Hill, Pa., assignors to Gulf Research & Development Company, Pittsburgh, Pa., a corporation of Delaware
No Drawing. Filed Aug. 10, 1959, Ser. No. 832,454
8 Claims. (Cl. 44—75)

This invention relates to stable gasoline motor fuel compositions and more particularly to stable gasoline motor fuel compositions containing addition products of olefin oxides and either the sulfide-modified condensation products of substituted phenols and low molecular weight aliphatic aldehydes, or partial metal salts of such condensation products.

As is well-known, many gasoline motor fuels, particularly those containing cracked components, are unstable and tend to deteriorate and to form gums during storage. "Gum," as it occurs in gasoline, is a dark-color polymer formed by the polymerization or oxidation of diolefins contained in the gasoline. During vaporization in the intake system of an internal combustion engine of gasoline containing dissolved gums or other deterioration products, solids will be deposited in the carburetor (sometimes causing the jets to be plugged), on the intake valves, cylinder heads, and/or cylinder walls of such engine, thereby interfering with the proper functioning of the engine.

It has now been found that the stability characteristics of normally unstable gasolines can be improved by incorporation therein of a small proportion of an addition product of an olefin oxide containing 2 to 4 carbon atoms per molecule and either a sulfide-modified condensation product of a monohydric phenol that is unsubstituted in the ortho positions and that contains a hydrocarbon substituent having 4 to 18 carbon atoms, and an aliphatic aldehyde containing 1 to 4 carbon atoms per molecule, or a partial salt of such sulfide-modified condensation product and an alkali metal, ammonia, a low molecular weight amine, or a metal of Group II of Mendeleeff's Periodic Table. The sulfide with which the condensation product is modified is one that is capable of making available free hydrogen sulfide in the condensation reaction. Gasoline motor fuels containing the above-indicated addition products, being less susceptible to deterioration during storage, are better able to function as fuels in internal combustion engines. The sulfide-modified condensation products we prefer have the general formula:

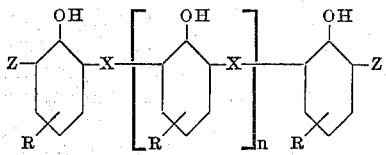

where R is a straight or branched chain alkyl group containing 4 to 12 carbon atoms, preferably para to the hydroxyl group of the phenolic nucleus, where Z is hydrogen, methylol, ethylol, propylol, or butylol, n is 1 to 9, at least one X group per molecule is a group having the general formula:

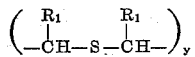

y being 1 to 3, and the other X groups in the molecule are groups having the formula:

where $R_1$ is hydrogen, methyl, ethyl, or propyl. The phenolic nuclei can be further substituted with hydrocarbon groups that are the same as or different from R, or with nonhydrocarbon substituents that do not adversely affect the gasoline solubility or gum inhibiting properties of the addition products. Excellent results have been obtained with the addition products of 1,2-propylene oxide and the partial calcium salts of the sodium sulfide-modified condensation products of p-1,1,3,3-tetramethylbutylphenol and formaldehyde, and these materials are therefore preferred. However, there can be used in accordance with the present invention addition products of other olefin oxides, such as ethylene oxide and 1,2-butylene oxide, and the sulfide-modified condensation products of other aldehydes such as acetaldehyde, propionaldehyde, and butyraldehyde, and other substituted phenols such as n-butylphenol, sec-butylphenol, tert-butylphenol, 2-tert-butyl-4-methylphenol, 2,4-di-tertbutylphenol, 2,6-di-tert-butylphenol, 2-tert-butyl-4-ethylphenol, n-amylphenol, di-tert-amylphenol, hexylphenol, heptylphenol, n-octylphenol, nonylphenol, decylphenol, triisobutylphenol, "wax" phenols and the like, and/or the partial salts of such condensation products and ammonia, triethylamine, triethanolamine, or metals such as sodium, potassium, barium, strontium, calcium, zinc, and magnesium.

We prefer to employ the addition products disclosed herein in gasoline in proportions in the range of about 0.01 to 0.035 percent by weight, but other proportions can be used. For example, an appreciable improvement can be obtained by the use of as little as 0.001 percent of the addition products disclosed herein. Ordinarily, no additional advantages from the standpoint of gasoline stability will be obtained by the use of more than about 0.05 percent by weight of the addition products.

The exact manner in which the addition products disclosed herein function to stabilize gasolines is not definitely known. However, it is presumed that the addition products disclosed herein function at least in part by being preferentially oxidized, thereby preventing polymerization or oxidation of gum precursors, that is, diolefins.

The addition products disclosed herein can be prepared in any convenient way. For example, they can be prepared by the method disclosed in copending application Serial No. 832,453, filed August 10, 1959, directed to the addition products as such, and to the process for preparing them. Briefly, in accordance with the process described in that application, the addition products disclosed herein can be prepared by reacting the desired olefin oxide with either a sulfide-modified condensation product of the kind referred to above or the desired partial salt thereof in proportions of about 0.1 to 2 moles of olefin oxide for each phenolic nucleus per mole of the sulfide-modified condensation product or partial salt thereof. The addition reaction can be carried out at ambient conditions of temperature and pressure, but temperatures in the range of about 95° F. to 180° F. are preferably employed to facilitate the reaction. When the addition reaction is complete, usually in less than about two hours, the temperature is raised above the boiling point of water, say to 300° F., in order to strip off any unreacted olefin oxide and in order to dry the product.

The sulfide-modified condensation products are prepared by condensing the desired aldehyde and the desired substituted monohydric phenol in the presence of a sulfide that is capable of making available free hydrogen sulfide under the condensation conditions. The aldehyde is reacted in the proportion of at least one mole for each two moles of the substituted phenol, and the sulfide is reacted in the proportion of about 0.05 to 1.8 equivalents of sulfide for each two moles of the substituted phenol. Although the condensation reaction will proceed essentially spontaneously at ambient atmospheric conditions, it is preferred to carry out the condensation reaction at temperatures not exceeding about 200° to 400° F., said maximum temperature being chosen so as to avoid excessive volatilization of aldehyde. The condensation reaction is normally carried out in an aqueous alkaline medium. When a partial salt of the sulfide-modified condensation product and an alkali metal, ammonia, or an alkaline earth metal is desired, the sulfide can be an alkali metal, ammonium, or an alkali metal sulfide, or polysulfide. When the sulfide-modified condensation product is desired as such, this material can conveniently be obtained by treatment of the corresponding partial sodium salt, obtained as described, with a strong mineral acid such as hydrochloric acid. When a partial salt of an amine or a Group II metal other than an alkaline earth metal is desired, such salts can be obtained conveniently by reaction of the desired amine or a basic compound of the Group II metal with the sulfide-modified condensation product obtained as described above, or alternatively, in the case of the Group II metal partial salts, the Group II metal partial salts can be formed by metathesis of the alkaline metal partial salt and a water-soluble partial salt such as a chloride or nitrate of the desired Group II metal.

The addition products disclosed herein can be added to gasoline in any convenient manner. For example, the addition products can be added as such to normally unstable gasolines or they can be added in the form of concentrated solutions in light hydrocarbon oils, such as light lubricating oil, naphtha, gasoline, and kerosine, or in other solvents miscible with the gasoline in order to facilitate blending. If desired, the addition products also can be added to the normally unstable gasolines in admixture with one or more other addition agents adapted to improve one or more properties of the gasoline.

The stabilizing properties of the addition products disclosed herein have been demonstrated by subjecting gasoline compositions containing representative addition products whose use is inclined by the present invention to the standard ASTM induction period test for the oxidation stability of gasoline, which is used as an indication of the tendency of motor gasoline to form gum in storage. Briefly, this test, having the designation ASTM D–525, involves placing the test gasoline in a laboratory bomb under oxygen gas under pressure, placing the bomb in a constant temperature bath, and determining the time in minutes required before a sharp decrease in pressure occurs in the bomb. The addition product subjected to the test was prepared by dissolving 412 parts by weight (2 moles) of 1,1,3,3-tetramethylbutylphenol in a light lubricating oil (76° SUS/100° F.) and heating the mixture to about 160° F. and by adding to the mixture 230 parts by weight of a 50 percent by weight aqueous solution of technical grade, 60 percent purity, sodium monosulfide (0.9 mole). The mixture was heated to about 320° F. to remove water and then cooled to about 150° F. Thereafter, 170 parts by weight (2 moles) of a 37 percent aqueous formaldehyde solution was added to the initial reaction product over a period of about 15 minutes. The mixture was then heated with agitation, the temperature of the mixture being maintained at 170° to 180° F. for about two hours. Unreacted formaldehyde was removed by distillation. A material prepared essentially as described above, except for the use of a volatile hydrocarbon solvent instead of the lubricating oil was determined to have the following general formula:

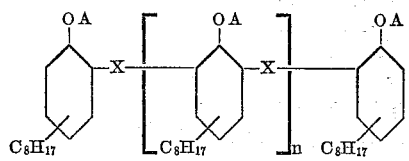

where $n$ is an average of 5, where an average of 5 of the average total of 7 "A" substituents per molecule are sodium, the remainder being hydrogen, and an average of 2 of the average total of 6 "X" groups per molecule are —$CH_2$—S—$CH_2$— groups, the remainder being methylene groups. Infrared spectrophotometric examination of the above material also indicated the presence of a methylol substituent in the free ortho positions of at least some of the therminal phenolic substituents of the reaction mixture. The material produced as indicated, after removal of the volatile solvent, had the following characteristics:

|  | Actual | Theoretical for Above-Indicated Formula |
|---|---|---|
| Molecular Weight | 1,709 | 1714 |
| Sulfated Residue, Percent | 19.3 | 20.7 |
| Sulfur, Percent | 3.24 | 3.73 |

The lubricating oil solution of the reaction product material prepared as indicated above was next metathesized by admixture with 75 parts by weight of calcium chloride (0.65 mole) dissolved in water and heating to a temperature of 280° F. to remove water. The resulting product was then filtered to remove salt. There was then added an additional 500 parts by weight of the light lubricating oil described above. To this mixture there was added 58 parts by weight (1.0 mole) of propylene oxide, which was allowed to react at a temperature of about 98° F. for one-half hour.

The addition product prepared as described above was added to separate samples of a regular grade commercial-type motor gasoline containing 3 ml. per gallon of tetraethyl lead in the respective proportions of 40 and 100 pounds of addition product (active material) per thousand barrels of gasoline, that is, about 0.012 percent and about 0.033 percent by weight. The results of the above-described tests were as follows:

|  | Base Gasoline | Example 1, Gasoline | Example 2, Gasoline |
|---|---|---|---|
| Oxidation Stability, ASTM D 525–55, Minutes | 615 | 720 | 750 |

To another base gasoline, a commercial-type premium grade gasoline stock containing 2.6 ml. of tetraethyl lead per gallon, there was added, in the proportion of 40 pounds per thousand barrels of gasoline, an addition product prepared essentially as described from the following reactants in the following proportions.

Make-up, moles:
    Octylphenol _____ 2.0
    Sodium sulfide ($Na_2S$) _____ 0.9
    Formaldehyde _____ 2.0
    Calcium chloride _____ 0.9
    1,2-propylene oxide _____ 1.0

Separate samples of the above-indicated gasoline were tested for existent gum (ASTM D381), copper dish gum, oxidation stability (ASTM D525), and ultra-violet light stability. The copper dish gum test is carried out substantially similarly as the existent gum test, except that the test is accelerated by the use of a copper evaporating dish. The ultra-violet light stability test is carried out by exposing the test gasoline in a fused quartz container in a standard Eveready C-3B carbon arc solarium unit. The results of the tests were as follows:

|  | Base Gasoline | Example 3 Gasoline |
|---|---|---|
| Inspection: |  |  |
| Existent Gum, ASTM D 381, Solvent Washed, Mg./100 Ml | 1 | 3 |
| Copper Dish Gum, Solvent Washed, Mg./100 Ml | 46 | 11 |
| Oxidation Stability, ASTM D 525, Min | 135 | 315 |
| U.-V. Light Stability, Hrs. to Haze | 1 | 4 |

From the foregoing test results it will be seen that the addition products of this invention increase the light stability and oxidation stability of gasolines and reduce copper-catalyzed gum formation without significantly increasing the existent gum content of the gasoline.

A non-metallic addition product whose use is included by this invention is prepared by reacting two moles of 1,1,3,3-tetramethylbutylphenol dissolved in toluene with 0.9 mole aqueous sodium sulfide in water, and then reacting this material with two moles of 37 percent aqueous formaldehyde, similarly as in the previously described specific embodiment. The reaction mixture is then heated to about 270° F. to remove water and toluene. The dried product is taken up in benzene and filtered through celite. A portion of the filtered benzene solution referred to above is acidified with 10 percent aqueous hydrochloric acid. The product is dehydrated, filtered through celite, washed with water until neutral, and heated to 300° F. to remove benzene. A product prepared as described was found to contain approximately 75 percent active product having the general formula:

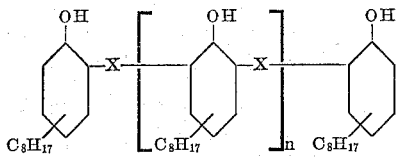

where $n$ is an average of 1, where an average of 1 of the average total of two X groups per molecule are —$CH_2$—S—$CH_2$— groups, the other of said X groups being a methylene group. Infrared spectrophotometric examination of the above material also indicated the presence of a methylol substituent in the free ortho positions of at least some of the terminal phenolic substituents of the reaction product. The remainder of the above-obtained reaction product was determined to have the same composition as indicated by the above general formula except that both X groups were methylene groups in said remainder. The above-indicated reaction product was determined to have the following characteristics:

|  | Actual | Theoretical for above-Indicated Formula |
|---|---|---|
| Molecular Weight | 737 | 735 |
| Sulfur, percent | 3.24 | 3.21 |

A partial salt of the above-indicated non-metallic condensation product is prepared by reacting the latter with triethylamine in the proportion of one mole of the condensation product with one mole of the amine. This partial salt is then reacted with 1,2-propylene oxide in a 1:1 mol proportion. A gasoline motor fuel of good stability characteristics, Example 4, is obtained by incorporating the resulting addition product in the base gasoline of Example 3 in a proportion of 50 pounds of addition product per thousand barrels of gasoline.

Still other examples of gasoline compositions that can be prepared in accordance with this invention are gasoline compositions containing addition products prepared in accordance with the above-indicated procedure and having the make-up indicated in the following table:

*Table*

|  | Example 5, Gasoline | Example 6, Gasoline |
|---|---|---|
| Base Gasoline | 100 | 100 |
| Addition Agent, Lbs. per Thousand Barrels | 50 | 50 |
| Make-up, Moles: |  |  |
| Octylphenol | 2.0 |  |
| Butylphenol |  | 2.0 |
| Sodium Sulfide | 0.5 |  |
| Ammonium Sulfide |  | 0.9 |
| Calcium Chloride | 0.5 |  |
| Barium Chloride |  | 0.9 |
| Formaldehyde |  | 2.0 |
| Acetaldehyde | 2.0 |  |
| Propylene Oxide |  | 0.5 |
| Ethylene Oxide | 1.5 |  |

The above-indicated specific embodiments are illustrative only, and there can be substituted for the materials therein in the same or equivalent proportions other addition products disclosed herein. For example, there can be used, in lieu of the corresponding materials of the examples, butylphenol, heptylphenol, dodecylphenol, and 2-tert-butyl-4-methylphenol, potassium, lithium, barium, mono- and poly-sulfides, barium and strontium chlorides, triethanolamine, tributylamine, and dimethylamine, and ethylene and butylene oxides.

The gasoline compositions of this invention may contain in addition to the gum inhibitors disclosed herein other addition agents adapted to improve one or more properties of base gasoline. Thus, the gasoline compositions can contain rust and corrosion inhibitors such as amine salts of organic phosphates, preignition suppressors such as alkylol phosphates, antiknock agents such as tetraethyl lead, lead scavengers such as ethylene dichloride and dibromide, dyes, metal deactivators such as N,N'-disalicylidene-1,2-propylenediamine, and other antioxidants such as N,N'-di-sec-butyl-para-phenylenediamine, 2,4-dimethyl-6-tert-butylphenol or 2,6-ditertiary butyl-4-methylphenol.

Many modifications and variations of the invention as herein described will suggest themselves to those skilled in the art, and resort may be had to such variations and modifications without departing from the spirit and scope of the invention. Accordingly, the present invention is to be limited only by the scope of the claims appended hereto.

We claim:

1. A gasoline motor fuel composition comprising a major amount of a normally unstable hydrocarbon mixture boiling in the gasoline range and a small amount sufficient to improve the stability of the mixture, of an addition product of an olefin oxide containing 2 to 4 carbon atoms per molecule and a member of the group consisting of (a) a sulfide-modified condensation product of an aliphatic aldehyde containing 1 to 4 carbon atoms per molecule and a substituted monohydric phenol that is unsubstituted in the ortho positions and that has a hydrocarbon substituent containing 4 to 18 carbon atoms, said condensation product containing at least one gram atomic weight of sulfur per gram molecular weight of condensation product and containing 3 to 11 phenolic nuclei per molecule, and (b) partial salts of said sulfide-modified condensation products and a member of the group consisting of alkali metals, ammonia, low molecular weight amines, and Group II metals, the sulfide with which said condensation product is modified being a substance capable of making available free hydrogen sulfide in the condensation reaction.

2. The fuel composition of claim 1 where said small proportion is about 0.001 to 0.05 percent by weight of the composition.

3. The fuel composition of claim 1 where said small amount is about 0.01 to 0.035 percent by weight of the composition.

4. A gasoline motor fuel composition comprising a major amount of a normally unstable hydrocarbon mixture boiling in the gasoline range and a small amount sufficient to improve the stability of the mixture, of an addition product of an olefin oxide containing 2 to 4 carbon atoms per molecule and a partial salt of a Group II metal and an alkali metal sulfide-modified condensation product of an aliphatic aldehyde containing 1 to 4 carbon atoms per molecule and a substituted monohydric phenol that is unsubstituted in the ortho positions and that has a hydrocarbon substituent containing 4 to 18 carbon atoms.

5. A gasoline motor fuel composition comprising a major amount of a normally unstable hydrocarbon mixture boiling in the gasoline range and a small amount sufficient to improve the stability of the mixture, of an addition product of an olefinic oxide containing 2 to 4 carbon atoms per molecule and a partial salt of an alkaline earth metal and an alkali metal sulfide-modified condensation product of an aliphatic aldehyde containing to 1 to 4 carbon atoms per molecule and a substituted monohydric phenol that is unsubstituted in the ortho positions and that has a hydrocarbon substituent containing 4 to 18 carbon atoms.

6. A gasoline motor fuel composition comprising a major amount of a normally stable hydrocarbon mixture boiling in the gasoline range and a small amount sufficient to inhibit oxidative deterioration of the mixture, of an addition product of propylene oxide and a partial salt of calcium and a sodium sulfide-modified condensation product of formaldehyde and an octylphenol that is unsubstituted in the ortho positions.

7. A gasoline motor fuel composition comprising a major amount of a normally unstable hydrocarbon mixture boiling in the gasoline range and a small amount sufficient to improve the stability of the mixture, of an addition product of an olefin oxide that contains 2 to 4 carbon atoms per molecule and a member of the group consisting of (a) sulfide-modified condensation products having the general formula:

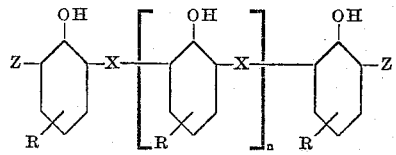

and (b) partial salts of such sulfide-modified condensation products and a member of the group consisting of alkali metals, ammonia, low molecular weight amines, and Group II metals, where R is an alkyl group containing 4 to 12 carbon atoms, where Z is selected from the group consisting of hydrogen, methylol, ethylol, propylol, and butylol, $n$ is 1 to 9, and at least one X group per molecule is a group having the general formula:

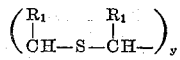

$y$ being 1 to 3, and the other X groups in the molecule are groups having the formula:

where $R_1$ is selected from the group consisting of methyl, ethyl, and propyl.

8. A gasoline motor fuel composition comprising a major amount of a normally stable hydrocarbon mixture boiling in the gasoline range and a small amount sufficient to inhibit oxidative deterioration of the mixture, of an addition product of propylene oxide and a member of the group consisting of (a) sulfide-modified condensation products having the general formula:

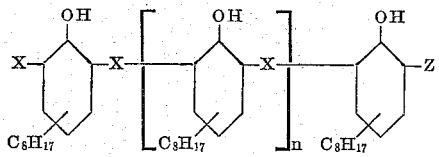

and (b) partial salts of such condensation products and an alkaline earth metal, where Z is selected from the group consisting of hydrogen and methylol, where $n$ is 1 to 9 and at least one of said X groups per molecule is —CH$_2$—S—CH$_2$—, the remainder of said X groups being methylene groups.

References Cited in the file of this patent
UNITED STATES PATENTS

| | | |
|---|---|---|
| 2,346,826 | Cook et al. | Apr. 18, 1944 |
| 2,362,289 | Mikeska | Nov. 7, 1944 |
| 2,629,743 | Burnette et al. | Feb. 24, 1953 |
| 2,772,238 | Lowe | Nov. 27, 1956 |

UNITED STATES PATENT OFFICE
CERTIFICATE OF CORRECTION

Patent No. 3,035,908            May 22, 1962

Ralph I. Gottshall et al.

It is hereby certified that error appears in the above numbered patent requiring correction and that the said Letters Patent should read as corrected below.

Column 3, line 42, for "inclined" read -- included --; column 4, line 9, for "therminal" read -- terminal --; column 7, line 19, for "olefinic" read -- olefin --; column 8, lines 29 to 34, upper left-hand portion of the formula, for "X—" read -- Z— --.

Signed and sealed this 9th day of October 1962.

(SEAL)
Attest:

ERNEST W. SWIDER
Attesting Officer

DAVID L. LADD
Commissioner of Patents